United States Patent [19]

Hallström et al.

[11] Patent Number: 4,586,565
[45] Date of Patent: May 6, 1986

[54] PLATE EVAPORATOR

[75] Inventors: Bengt Hallström, Lund; Olle Olsson, Åstorp; Ulf Bolmstedt, Staffanstorp; Björn-Olow Johansson, Lomma, all of Sweden

[73] Assignee: Alfa-Laval AB, Tumba, Sweden

[21] Appl. No.: 328,692

[22] Filed: Dec. 8, 1981

[30] Foreign Application Priority Data

Dec. 8, 1980 [SE] Sweden ............................ 8008594

[51] Int. Cl.⁴ ........................... F28F 13/08; B01D 1/22
[52] U.S. Cl. ...................................... 165/167; 165/146; 165/147; 159/13.2; 159/28.6
[58] Field of Search ............... 165/174, 166, 167, 159, 165/147, 146; 159/28.6, 13.2

[56] References Cited

U.S. PATENT DOCUMENTS

| 266,220 | 10/1982 | Strong ............................ | 165/147 |
| 708,712 | 9/1902 | Hill ................................. | 165/147 |
| 1,689,927 | 10/1928 | Newhouse ...................... | 165/174 |
| 2,117,337 | 5/1938 | Lobl et al. ..................... | 165/140 |
| 2,285,225 | 6/1942 | Norris ............................ | 165/147 |
| 2,872,165 | 2/1959 | Wennerberg .................. | 165/147 |
| 3,412,777 | 11/1968 | Dönell et al. .................. | 165/166 |
| 3,724,523 | 4/1973 | Mattern ........................ | 165/147 |
| 4,182,411 | 1/1980 | Sumitomo et al. ............. | 165/167 |
| 4,301,864 | 11/1981 | Kivikas et al. ................ | 165/174 |

FOREIGN PATENT DOCUMENTS 859876  1/1961  United Kingdom .

Primary Examiner—William R. Cline
Assistant Examiner—John K. Ford
Attorney, Agent, or Firm—Cyrus S. Hapgood

[57] ABSTRACT

A plate evaporator of the rising film type and/or the falling film type comprises several heat exchange plates essentially vertically arranged in spaced face-to-face relationship to define evaporation passages alternating with heating medium passages. Evaporation passages with increasing cross-sectioned area and decreasing perimeter in the flow direction of the feed liquid are formed by providing adjacent plates encompassing one evaporation passage with bulges (for example, ridges) which bulges, compared with imaginary planar plates, entail reduced volume of the evaporation passages. The size of said bulges (that is, the volume-reducing effect of said bulges) is gradually reduced in the flow direction of the medium to be evaporated. Thus, the cross-sectional area of the evaporation passages is increased while their perimeter is reduced in said direction.

17 Claims, 10 Drawing Figures

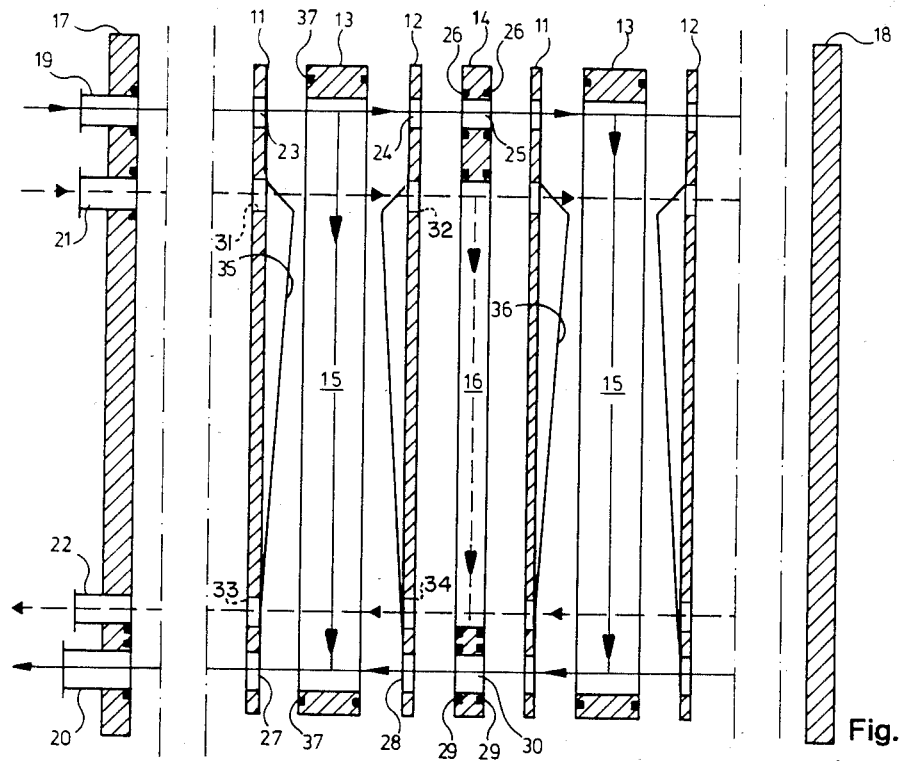
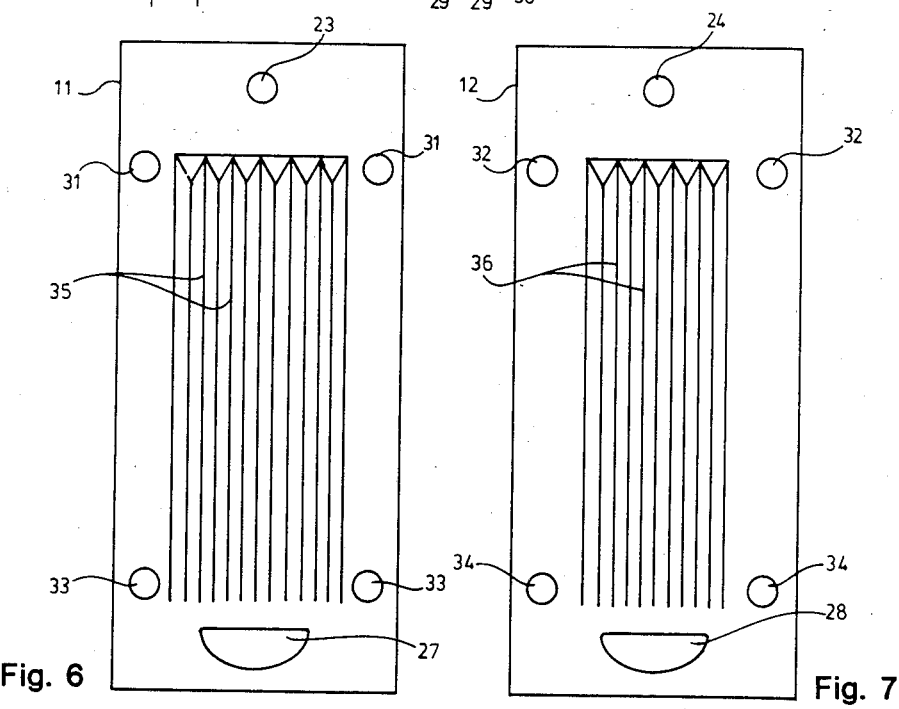
Fig. 5
Fig. 6
Fig. 7

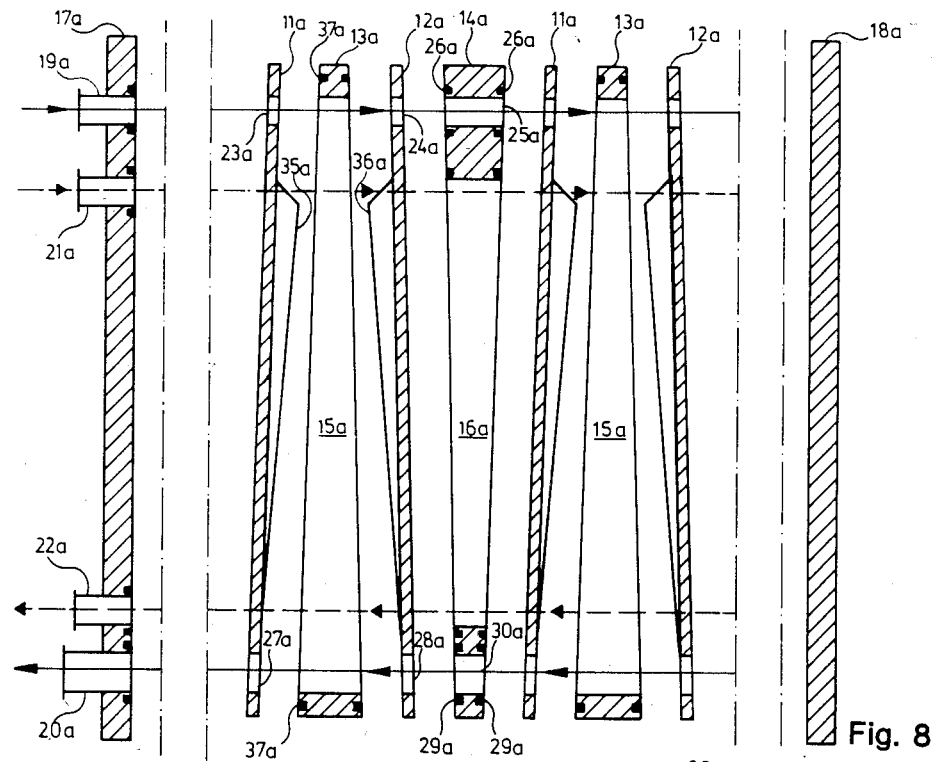
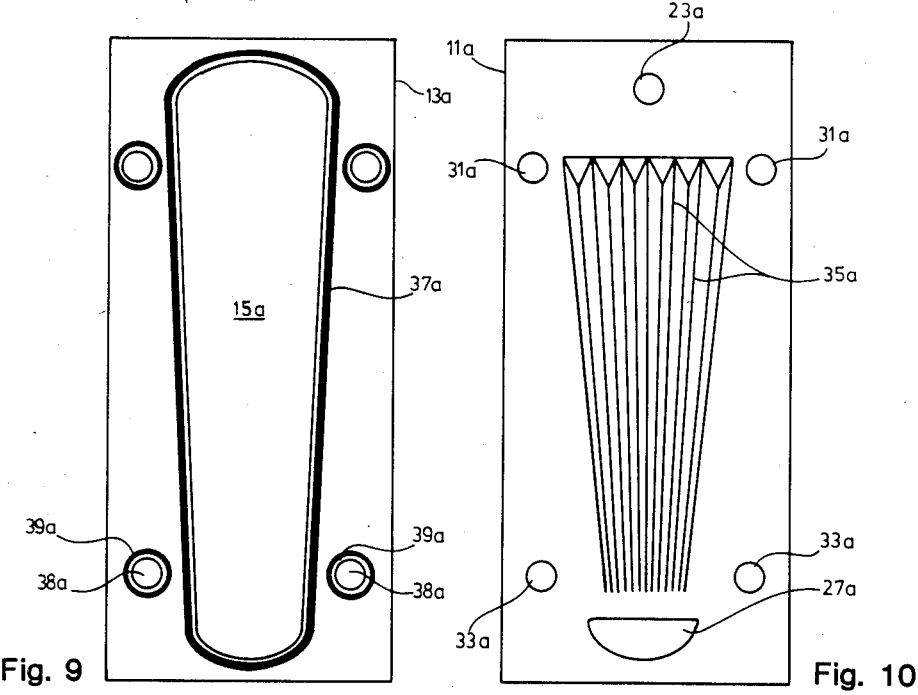
Fig. 8
Fig. 9
Fig. 10

PLATE EVAPORATOR

The present invention relates to an evaporator of the plate heat exchanger type comprising several heat exchanger plates essentially vertically arranged in spaced face-to-face relationship to define flow spaces between the plates for liquid to be evaporated and for heating medium.

In evaporators of the falling film type as well as the rising film type, liquid films are forced to move along essentially vertical heat transfer walls with the generated steam between the film surfaces in the evaporation passages. The traditional evaporator passage of constant cross-section has two drawbacks, one being that the speed of the generated steam increases in the flow direction of the feed liquid, the other one being that the perimeter wetted by the liquid is constant in said direction. These features result in thinning of the liquid film along the heating surfaces; and in case of a low feed flow, they lead to film disruption and dry boiling. In practice, this problem is often solved by overloading on the product side, which means maintaining an unnecessarily thick film along a larger part of the heating surfaces, giving low heat transfer values and requiring long heating surfaces. Also, if for a heat sensible product the problem is solved by recirculation, a lower product quality is obtained due to a long residence time.

For the above-mentioned reasons, an ideal evaporator passage should have a decreasing perimeter and increasing cross-section in the flow direction.

The requirement of a gradually increasing cross-section of the evaporator passages has been realized and effected in prior devices of the plate type as well as the tube type.

In U.S. Pat. No. 2,117,337, which relates to a tube evaporator, a circular evaporator channel is provided with an internal conical body for heating steam, whereby expanding evaporator channels and also decreasing wetted perimeter with respect to the internal heat transfer surface are obtained. Along the external heat transfer surface, however, the wetted perimeter is constant. Swedish Pat. No. 219,561 discloses a special evaporator in which the two desired features of decreasing wetted perimeter and increasing cross-section of the evaporation passages are met in the form of channels between two conical plate elements with different cone angles.

For plate heat exchangers, several ways to achieve increasing cross-section of the flow passages have been suggested. British Pat. No. 788,193 shows heat exchanger plates provided with horizontally extended corrugations, and increasing evaporation channel cross-section in the flow direction is achieved by successively changing the angle of said corrugations in direction. However, the desired reduction of the wetted perimeter in the flow direction is not obtained in this way. British Pat. No. 859,876 discloses an evaporator in which the liquid to be evaporated is first forced upwards between one pair of plates and then downwards between another pair of plates. One suggestion to achieve increased channel cross-section in this evaporator is to locate the last mentioned pair of plates at a larger distance from each other than the distance between the first mentioned pair of plates. Another suggestion is to use a larger number of plate interspaces for the downward flow than for the upward flow. Further, it is suggested to divide the flow passages for the feed liquid in an upwardly and a downwardly diverging part and to force the liquid first to stream upwards in the upwardly diverging part of a plate interspace and then to stream downwards in the downwardly diverging part of another plate interspace. In fact, a gradually increasing cross-section of the evaporator channel is thereby obtained, although the perimeter even increases in the flow direction.

To be a realistic alternative from the economical point of view, an evaporator in which the two above-mentioned desired features are combined must not be too complicated to manufacture. Particularly if pressed plates are used, the press pattern must be designed so that reasonable press matrix costs and a minimal number of press patterns or plate embodiments are obtained. Further, to facilitate cleaning of the evaporation surfaces and to avoid operational disturbances due to clogging of the evaporation channels, a simple channel design is required.

The principal object of the present invention is to provide an evaporator of the plate type in which the desired features of decreasing wetted perimeter and increasing cross-section of the evaporation passages in the flow direction, as well as the above-noted requirements of simple channel design and safe operation, are met.

A plate evaporator made according to the invention is characterized mainly in that at least one of two adjacent plates encompassing one evaporation passage is provided with bulges (i.e., ridges) which, compared with imaginary planar plates, entail volume reduction of the evaporation passages. Also, the volume per unit length of the bulges decreases in the flow direction of the liquid to be evaporated so that the cross-section of the evaporation passages increases and the perimeter of said passages decreases in said direction. The change of the bulge volume in the flow direction can be effected in different ways. For example, a larger number of bulges can be provided at the beginning of the evaporation channel than at the end of the same. Another way is to provide bulges with decreasing dimensions, such as decreasing bulge height, in the longitudinal direction of the plate.

In an advantageous embodiment of the invention, the plate bulges consist of vertically extended ridges with decreasing height in the flow direction. Suitably, the height of the ridges can be continuously reduced, the ridge top following essentially a straight line that forms a small angle with the base plane of the plate. In this embodiment, the evaporation passages are encompassed by walls extending essentially straight and smoothly in the vertical direction, which reduces the risk of film disruption even with very thin films.

In a particularly advantageous embodiment of the invention, both of the plates encompassing one evaporation passage are provided with opposite ridges, the ridges of one plate being displaced half the pitch distance with respect to the ridges on the other plate. This embodiment has several advantages. A large change of the cross-section and the perimeter of the evaporation channel can thereby be obtained if so desired. Further, two plates forming an evaporation passage and being fixed with said relative displacement can have the same press profile, and consequently the number of press patterns can be reduced to only one single pattern. Further, since the above-noted mutual location of the pair of plates to form an evaporation passage does not prevent the location of two plates forming a heating medium passage with their ridges just opposite each other, support points are available between the plates on the heating medium side in the regions between the ridges. Consequently, a stable plate pack can be constructed without support points or support elements in the evaporation passages within the plate borders, that is, in the main part of the evaporation passages. Thus, cleaning of the evaporation surfaces is facilitated and the risk of clogging and film disturbance is minimized.

According to our co-pending patent application Ser. No. 329,573, filed Dec. 10, 1981, the desired feature of successively increasing the cross-section of the evaporation passages is achieved by diverging plate surfaces in the flow direction, and the desired perimeter reduction is achieved by gradual reduction of the total width of the evaporation passages. The combination of one or both of these measures with the measure according to the present invention, to provide changing bulges along one evaporation passage, improves the possibility of achieving an optimal channel design for any specific evaporation applcation.

The invention will now be further described in connection with a few embodiments of evaporators of the falling film type and with reference to the accompanying drawings in which FIG. 1 is a schematically-shown longitudinal section through an evaporator channel;

FIGS. 2A—A through D—D are sectional views on lines A—A through D—D, respectively, in FIG. 1 and showing the channel with trapezoid ridge profile;

FIG. 5 is a longitudinal sectional view of evaporator elements of a plate pack;

FIG. 6 and FIG. 7 are elevational views of plate elements shown in FIG. 5;

FIG. 8 is a view similar to FIG. 5 but showing a modified form of the plate pack; and FIGS. 9 and 10 are elevational views of elements shown in FIG. 8.

Figure 1:
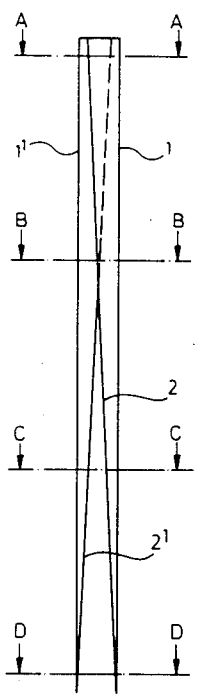
Figure 2:
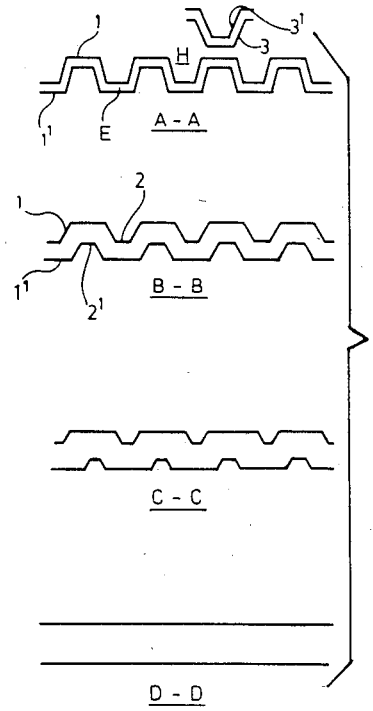

As shown in FIGS. 1 and 2, two plates 1, 1', which form an evaporator channel E, have the same corrugation pattern while being located with their ridges 2, 2' displaced half the pitch distance with respect to each other. From the cross-sections AA—DD, it can be seen that the cross-sectional area of the evaporation channel increases substantially while the periphery (perimeter) of the cross-sectional area decreases in the flow direction of the falling film. Above the Section AA the next pair of plates 3, 3' is shown. Between the two pairs of plates 1, 1' and 3,3' a heating medium passage H is formed.

Figure 3:
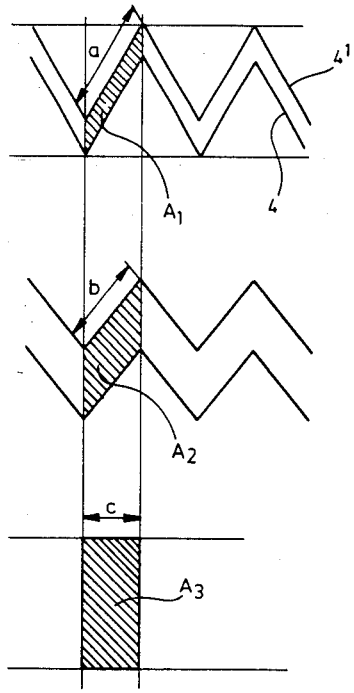
FIG. 3 shows a number of cross-sections through an evaporator channel with triangular ridge profile.

As shown in FIG. 3, an evaporator channel is formed between plates 4, 4' having triangular ridge profile. From the arrows a, b and c in the three different cross-sections, it can be seen that the periphery (perimeter) of the channel's cross-sectional area is reduced approximatively to half while the cross-sectional area $A_1$–$A_3$ becomes about three times larger over the length of the plate in the flow direction.

Figure 4:
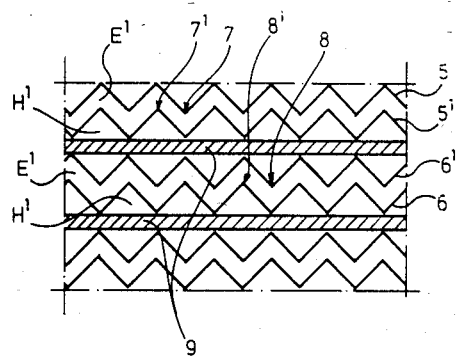
FIG. 4 shows the mutual location of the plates in a schematically-shown cross-section through an evaporator channel with the ridge profile shown in FIG. 3.

In the evaporator section shown in FIG. 4, the plates 5, 5', 6, 6' have the ridge profile shown in FIG. 3. The plates in the pair of plates 5, 5' and 6, 6' etc. are located so that the ridge tops 7, 8 extend into the evaporation passages E' between ridge tops 7', 8', forming zig-zag shaped passages. To form the heating medium passages H', however, the plates 5' and 6' etc. are located with their ridges just opposite each other. Bar elements 9 are fixed on the heating medium side across the ridges to serve as spacing elements and stabilizing elements. The valley regions between the ridges 7, 7', 8, 8' are thus utilized for support points in the heating medium passages H', while no support points occur in the evaporation passages E'.

An example of a falling film evaporator according to the invention is shown schematically in FIGS. 5-7. A plate pack comprises a number of heat exchange plates 11, 12 arranged between alternating spacer frames 13 and 14 to form evaporation passages 15 and heating medium passages 16, the pack also having end wall elements 17 and 18. The end wall element 17 is provided with an inlet 19 in its upper past for the product to be evaporated, an outlet 20 in its lower part for evaporated product and generated steam, and an inlet 21 and outlet 22 for heating medium.

The product stream fed to the evaporator flows into different evaporator passages 15 through apertures 23 and 24 in the plates 11 and 12 and passages 25 through the spacer frames 14, the latter passages being sealed from the heating medium passages 16 by means of gaskets 26. Evaporated product and generated secondary steam flow in the lower part of the evaporator towards the outlet 20 through apertures 27 and 28 in the plates 11 and 12 and through the corresponding passages 30 sealed by gaskets 29 in the spacer frames 14. The heating medium fed through the inlet port 21 flows through apertures 31 and 32 in the plates 11 and 12 and the corresponding gasketed passages (not shown) in the spacer frames 14 into the heating passages 16 and thence towards the outlet 22 through apertures 33 and 34 in the plates 11 and 12 and the corresponding gasketed passages (not shown) in the spacer frames 13.

The plates 11 and 12 are provided with vertically extended ridges 35 and 36. With respect to the evaporation passages 15, the ridges 35 are displaced relative to the ridges 36 so that the zig-zag shaped channel cross-section is formed as shown in FIG. 3. The evaporation passages 15 are sealed to the ambient atmosphere by means of gasket rings 37 arranged in the spacer frames 13. It will be understood that the parts 11–14, 17 and 18 are clamped together by conventional means (not shown) to form the plate pack.

In FIGS. 8–10 is shown a somewhat modified form of the embodiment shown in FIGS. 5–7. Since most details are exactly the same as in FIGS. 5–7, the same reference numbers have been used with the addition of the letter a. One modification is that the spacer frames 13a have an increasing thickness in the flow direction of the falling film. A further modification is that the plates 11a and 12a are provided with heat exchange surfaces having a width which decreases in the flow direction, and consequently the ridges 35a and 36a converge somewhat towards the middle of the plates.

As shown in FIG. 9, the spacer frame 13a has an angular sealing member 37a providing the corresponding further perimeter reduction of the evaporation passages 15a in the flow direction. FIG. 9 also shows passages 38a (not shown before) for heating medium and the corresponding gaskets 39a.

The above-described embodiments are selected primarily to exemplify the invention in principle. The function of the spacer frames may, of course, be included as an integrated part of the plates themselves, in which gasket grooves are pressed in a well known manner. The mutual divergence between the two heat exchange surfaces in such a case can be achieved by pressing out the two plate surfaces more and more towards each other in the direction towards the inlet end of the plates. Further, it is not necessary to feed or discharge all the flows through ports located inside the periphery of the plates. For example, the plate pack can be surrounded by a cover for product steam, and the plates can be designed to allow free product discharge at the lower end of the plate pack. This has the advantage that the entire length of the plates can be used for heat exchange.

The invention also includes such plate evaporators in which a pair of heat exchange plates are joined together by any sealing arrangement, such as welding, around the periphery of the plates to form closed spaces for product or heating medium. The product can be introduced into said spaces or forced to stream outside said spaces by means of any feed distribution system.

In FIG. 5, the path of the product to be evaporated and the evaporated product with generated stream is shown in full lines with arrows indicating the flow direction; and the path of the heating medium is shown in broken lines with arrows indicating the flow direction. As shown in FIGS. 6 and 7, apertures 31–34 for heating medium are located adjacent the longitudinal side edges of plates 11 and 12 so that they are displaced from the longitudinal center lines on which the section in FIG. 5 is taken. Therefore, these apertures appear only in broken lines in FIG. 5.

As is apparent from FIGS. 5–7, the heating medium flows into the upper part of passage 16 by way of two parallel paths each including one of the two apertures 31 in plate 11, a corresponding aperture (not shown) in spacer frame 13 and a corresponding one of the two apertures 32 in plate 12. Thus, the two streams of heating medium enter passage 16 adjacent opposite side edges thereof. Similarly, two streams of the heating medium discharge from the lower part of passage 16, adjacent opposite side edges thereof, into respective flow paths each including one of the two apertures 34 in plate 12, a corresponding aperture (not shown) in spacer frame 13 and a corresponding one of the two apertures 33 in plate 11. Of course, the inlet and outlet ports 21-22 for the heating medium as shown in FIG. 5 are located adjacent one side edge of wall 17 so as to serve a corresponding one of the two parallel flow paths, and a second set of these inlet and outlet ports (not shown) is located adjacent the opposite side edge of wall 4 to serve the other of the two parallel flow paths.

It will be understood from FIG. 2 that in each of the four cross-sectional views of the passge formed by plates 1—1¹, the periphery or perimeter of the passage consists of the top and bottom lines and two vertical lines (not shown) joining the top and bottom lines and representing the opposite side edges of the passage. Thus, the perimeter of the passage becomes successively shorter in the flow direction (downward in FIGS. 1 and 2). The ridges 2—1¹ constitute bulges which entail a reduced volume of the passage as compared to its volume if plates 1—1¹ were planar; and by causing the volume of these bulges to decrease in the flow direction, the cross-sectional area of the passage increases in the flow direction, as shown in FIG. 2.

What is claimed is:

1. A plate evaporator of the rising and/or falling film type comprising a series of heat exchange plates disposed substantially vertically in spaced face-to-face relationship to define evaporation passages through which a medium to be evaporated is adapted to pass in a flow direction, said plates also defining heating medium passages alternating with said evaporation passages, at least one of two adjacent plates defining an evaporation passage being provided with bulges which, as compared with imaginary planar plates spaced the same distance apart as said two adjacent plates, entail a reduced volume of the evaporation passage, the volume of said bulges, as measured from a said imaginary planar plate in the plane of the bulged plate, decreasing per unit of length in said flow direction through the evaporation passage over a substantial length thereof, the cross-sectional area of each evaporation passage increasing in said flow direction over said substantial length of the evaporation passage, the wetted perimeter of each evaporation passage, as seen in cross-section, decreasing in said flow direction over said substantial length.

2. The evaporator of claim 1, in which said bulges have ridges.

3. The evaporator of claim 2, in which said ridges extend substantially vertically with decreasing height in said flow direction.

4. The evaporator of claim 3, in which the two plates defining an evaporation passage have oppositely directed ridges, the ridges on one plate being displaced half the pitch distance with respect to the ridges on the other plate.

5. The evaporator of claim 1, in which the main part of each evaporation passage is free from support points between the two plates defining the evaporation passage.

6. The evaporator of claim 2, in which the two plates defining an evaporation passage have oppositely directed ridges, the evaporator comprising also means forming support points between the two plates defining a said heating medium passage, said support points being located in the plate regions between said ridges.

7. The evaporator of claim 6, in which said two plates defining a heating medium passage are located with their respective ridges opposite each other.

8. The evaporator of claim 6, in which said means are spacer elements for keeping in spaced relation the two plates defining a said heating medium passage.

9. The evaporator of claim 8, in which said spacer elements are bars extending across a plurality of said ridges.

10. The evaporator of claim 11, in which the width of each said evaporation passage decresses in said flow direction, thereby further decreasing the wetted perimeter of the evaporation passage in said flow direction.

11. The evaporator of claim 1, in which the two plates of each said pair defining an evaporation passage diverge from each other in said flow direction, thereby further increasing the cross-sectional area of the evaporation passage in said flow direction.

12. A plate evaporator of the rising and/or falling film type comprising a series of heat exchange plates disposed substantially vertically in spaced face-to-face relationship to define evaporation passages through which a medium to be evaporated is adapted to pass in a flow direction, said plates also defining heating medium passages alternating with said evaporation passages, there being a series of adjacent bulges on at least one of two adjacent plates defining an evaporation passage, said bulges on said one plate protruding into said evaporation passage and acting to reduce the volume of said evaporation passage by the volume of said bulges as measured from an imaginary planar plate in the plane of said one plate, each bulge on said one plate forming an elongated protrusion extending substantially continuously in said flow direction over a substantial length of said evaporation passage and defining with each adjacent bulge on said one plate a valley extending substantially continuously in said flow direction, each said bulge decreasing in volume per unit of length in said flow direction over said substantial length so that the cross-sectional area of the adjacent evaporation passage increases in said flow direction over said substantial length, the wetted perimeter of each evaporation passage, as seen in cross-section, decreasing in said flow direction over said substantial length and being substantially smaller at the downstream end of said substantial length than at the upstream end thereof.

13. The evaporator of claim 12, in which said bulges have ridges.

14. The evaporator of claim 13, in which the height of each ridge decreases in said flow direction.

15. The evaporator of claim 13, in which the two plates defining an evaporation passage have oppositely directed ridges, the ridges on one plate being displaced half the pitch distance relative to the ridges on the other plate.

16. A plate evaporator of the rising and/or falling film type comprising a series of heat exchange plates disposed substantially vertically in face-to-face relationship, there being a space between each pair of adjacent plates so as to provide a series of interplate spaces, spacer means located in alternate ones of said spaces, each spacer means forming with adjacent plates an evaporation passage through which a medium to be evaporated is adapted to pass in a flow direction, the others of said spaces forming heating medium passages alternating with said evaporation passages, there being a series of adjacent bulges on at least one of two adjacent plates defining an evaporation passage, said bulges on said one plate protruding into said evaporation passage and acting to reduce the volume of said evaporation passage by the volume of said bulges as measured from an imaginary planar plate in the plane of said one plate, each bulge on said one plate forming an elongated protrusion extending substantially continuously in said flow direction over a substantial length of said evaporation passage and defining with each adjacent bulge on said one plate a valley extending substantially continuously in said flow direction, each said bulge decreasing in volume per unit of length in said flow direction over said substantial length so that the cross-sectional area of the adjacent evaporation passage increases in said flow direction over said substantial length, each said spacer means having sides forming opposing sides of the corresponding evaporation passage and being so dimensioned that the spacing between the adjacent plates increases in said flow direction, thereby further increasing said cross-sectional area in said flow direction, the perimeter of each evaporation passage, as seen in cross-section, being defined by opposed surfaces of the adjacent plates and said opposing sides of the evaporation passage, those parts of said perimeter defined by said opposed surfaces of the adjacent plates decreasing in said flow direction over said substantial length.

17. The evaporator of claim 16, in which the width of each evaporation passage, as measured from one to the other of said opposing sides, decreases in said flow direction, thereby further decreasing said part of the perimeter in said flow direction.

* * * * *

UNITED STATES PATENT AND TRADEMARK OFFICE
CERTIFICATE OF CORRECTION

PATENT NO. : 4,586,565
DATED : May 6, 1986
INVENTOR(S) : BENGT HALLSTROM et al.

It is certified that error appears in the above—identified patent and that said Letters Patent is hereby corrected as shown below:

Column 5, line 60, change "$2-1^1$" to --$2-2^1$--.

Claim 10, line 1, change "11" to --1--.

Signed and Sealed this

Twenty-sixth Day of August 1986

[SEAL]

Attest:

Attesting Officer

DONALD J. QUIGG

Commissioner of Patents and Trademarks